United States Patent [19]

Carpenter

[11] Patent Number: 4,674,338
[45] Date of Patent: Jun. 23, 1987

[54] FLOW VOLUME DETECTION DEVICE
[75] Inventor: Frank Carpenter, Lake Charles, La.
[73] Assignee: Lake Charles Instruments, Inc., Lake Charles, La.
[21] Appl. No.: 688,867
[22] Filed: Dec. 31, 1984
[51] Int. Cl.⁴ .............................................. G01F 1/115
[52] U.S. Cl. ........................... 73/861.77; 200/81.9 M; 335/207; 73/198
[58] Field of Search ................. 73/861.77, 198, 861.94; 324/168, 174, 208; 335/207, 206, 205, 272; 340/671; 200/81.9 M

[56] References Cited

U.S. PATENT DOCUMENTS

| | | | |
|---|---|---|---|
| 2,843,698 | 0/0000 | Knauth | 335/207 |
| 2,915,606 | 12/1959 | Knauth | 335/207 |
| 2,988,916 | 6/1961 | Waugh | 73/861.77 |
| 3,053,087 | 9/1962 | Waugh | 73/861.78 |
| 3,108,163 | 10/1963 | Kripke et al. | 335/207 |
| 3,167,623 | 1/1965 | Kaleta | 335/207 |
| 3,325,756 | 6/1967 | Maxwell | 335/207 |
| 3,368,045 | 2/1968 | Harper | 200/81.9 M |
| 3,610,039 | 10/1971 | Althouse et al. | 73/861.77 |
| 3,681,727 | 8/1972 | Hallmann | 335/207 |
| 4,308,755 | 1/1982 | Millar et al. | 73/861.77 |

Primary Examiner—Herbert Goldstein
Attorney, Agent, or Firm—Browning, Bushman, Zamecki & Anderson

[57] ABSTRACT

The present invention is directed to an apparatus and method for monitoring the continued rotation of a non-magnetically attractive indicator, e.g., a rotating, plastic dial, disc, wheel, arm or the like of a meter. The present invention is particularly useful for detecting the satisfactory operation of flow meters, e.g., meters used to determine the flow of fluids from oil and gas wells, in transmission lines and in chemical processing plants. The present invention provides a system for monitoring the operation or rotation by employing a rotating, magnetically attractive actuator to actuate a magnetic switch which in turn actuates an electrical switch for producing a monitoring signal. The apparatus and method of the present invention provide a rigid, dependable, accurate and wear-free device for monitoring the continued operation of a flow or other meter.

9 Claims, 3 Drawing Figures

FLOW VOLUME DETECTION DEVICE

BACKGROUND OF THE INVENTION

1. Field of the Invention

The present invention generally relates to an apparatus and method for monitoring the continued rotation of a non-magnetically attractive indicator, e.g., a rotating, plastic dial, disc, wheel or arm of a meter. The present invention is particularly useful for detecting the satisfactory operation of flow meters, e.g., meters used to determine the flow of fluids from oil and gas wells, in transmission lines and in chemical processing plants. More particularly, the present invention relates to an apparatus and method employing the rotation of a magnetically attractive material for actuating magnetic and electrical switches for producing signals indicative of satisfactory operation of the flow meter.

2. Description of the Background

The desirability of observing and controlling the flow of a fluid through a conduit from a great distance has long been recognized by those associated with the oil and gas, the fluid transmission and the chemical processing industries. These observations would permit operators and controllers to more closely monitor flow and to more quickly react to deviations and malfunctions.

For example, it is important to have an accurate record of the fluid being pumped from remote oil and gas wells. Typical recording systems include conventional flow detection and volume devices interconnected with conventional rotating dial meters. These meters comprise a plurality of geared dials for displaying a number indicative of the volume of fluid passing through the conduit. In order to avoid the loss of production or lost/inaccurate measurement of production, it is desirable to have a means for a centrally located controller to observe the operation of these meters. Such observation permits immediate shut down of any well showing abnormal production and immediate dispatch of a repair crew. This immediate reaction is quite valuable to the oil and gas producer.

Conventional monitoring systems have included an electrical switch actuated by the meter movement to produce a signal at the central location. This signal has been used to actuate a variety of functions, including actuating a central counter, actuating a sampling device in the conduit near the meter and resetting an alarm device. The alarm is often a simple timer which must be reset within a predetermined time indicative of satisfactory operation of the meter showing the expected fluid flow. Failure of the signal to reset the alarm within the predetermined flow indicates an abnormal condition and will trigger shut down of the well pump and visual and/or audio alarms. Exemplary conventional systems have employed a cam on the meter shaft to operate a plunger or to operate a spring loaded lever to produce the necessary electrical output. These systems produce drag on the meter mechanism and contain rubbing parts which wear out. More recently, systems have been developed which incorporate a reed switch actuated by a magnet disposed on the rotating dial of the meter. These systems are plagued by the extreme fragility of the reed switch, particularly in view of the harsh environment and rough handling to which these devices are typically subjected. Further, the magnet rotating in a predominantly steel environment also produces drag on the meter.

Accordingly, there has been a long felt but unfulfilled need within the industry for a rigid, dependable and accurate apparatus and method useful for monitoring the continued rotation of a meter dial.

SUMMARY OF THE INVENTION

The present invention provides a new and improved apparatus and method for monitoring the continued rotation of a non-magnetically attractive indicator and particularly useful for monitoring the continued operation of flow meters and the like. The apparatus and method of the present invention are useful together with volume detection devices, automatic sampling devices, and alarm devices for detecting pump or meter abnormalities and for stopping the fluid flow.

In a simple embodiment of the present invention, an actuating means comprised of a magnetically attractive material disposed about a small arc of the periphery of the rotating indicator is employed to actuate a magnetic switching means disposed near the disc and actuated by the proximity of the actuating means. An electrical switching means for producing an output indicative of the rotation of the indicator is then actuated by the magnetic switching means. A ferrous material, e.g., an iron plug, is preferred as the actuating means although any magnetically attractive material producing the necessary force of magnetic attraction is sufficient. Even another magnet may be used as the actuating means to increase the actuating proximity although use of another magnet counteracts at least one of the advantages of the present invention.

The attractive force developed between the actuating means and the movable magnet of the magnetic switching means must be sufficient to overcome the force of a biasing means normally biasing the switching means to a first position. When a sufficient attractive force is developed by bringing said actuating means and said magnetic switching means into actuating proximity, the magnetic switch and the electrical switch are both actuated to a second position. Preferably, the biasing means comprises a plurality of magnets acting together with the movable magnet in the magnetic switching means.

A monitoring system in accord with the present invention as briefly described above is useful to supply an actuating electrical signal to a variety of other systems. For example, the produced electrical signal is useful to actuate an automatic sampling device to periodically sample the fluid flowing in the conduit near the meter. Further, the produced electrical signal is useful to trip a remote volume or flow monitor. Another useful application of the produced signal is to reset an alarm which is used to monitor fluid flow. Failure to reset such an alarm within a predetermined time indicative of expected normal operating conditions may result in activation of visual or audio alarms or in activation of a system to stop the fluid flow in the conduit near the meter.

A system in accord with the present invention provides a rigid, dependable, accurate and wear-free apparatus useful in a method for monitoring the continued operation of a fluid flow meter or the like, including a rotating, non-magnetically attractive indicator. Such a device produces no significant drag on the meter, includes no wearing parts and requires no maintenance. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed, description in connection with the accompanying drawings, wherein.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

The present invention is directed to an apparatus and method useful for monitoring the continued rotation of a non-magnetically attractive indicator, particularly the satisfactory operation of a flow meter or the like.

Figure 1:
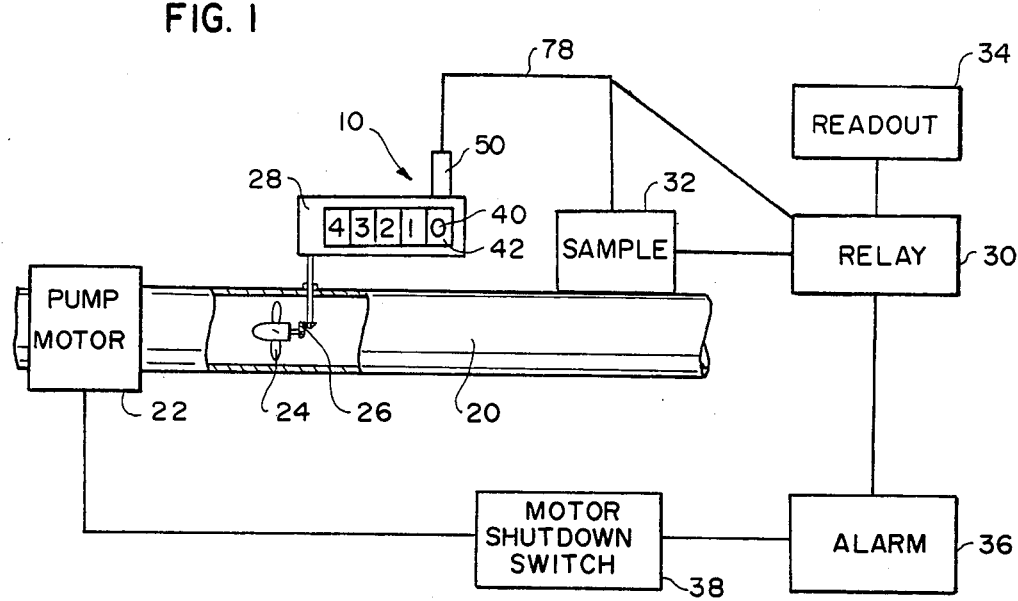
FIG. 1 is a schematic illustration of an apparatus in accord with the present invention for monitoring the operation of a flow detection device.

An apparatus 10 in accord with the present invention is schematically illustrated in FIG. 1. A pump 22 propels a fluid, e.g., the well fluids from a remote oil well, through a conduit 20. It is necessary and desirable to monitor and to record the volume of fluid flowing through the conduit 20. Accordingly, a means for converting the fluid flow to a measurable rotary motion is suspended within the conduit. For example, a propeller 24, series of vanes or other conventional device is suspended within the conduit 20. The rotary motion of the propeller 24 is transmitted and converted by appropriate gears 26 to a flow volume display meter 28. Within the display meter 28, the rotary motion is converted by conventional gears and the like for numerical display on a series of dials. For example, a plurality of appropriately geared plastic discs 42 having visually readable numbers disposed on the periphery thereof provide a conventional digital readout.

The system of the present invention is preferably adapted for use with a rotating indicator 42 comprised of a non-magnetically attractive material. For example, the indicator 42 may comprise a plastic, aluminum, stainless steel or wooden rotating disc, wheel, dial or arm. Disposed about a small arc of the periphery of the rotating indicator 42 is an actuating means comprising a magnetically attractive material. For example, a ferrous or iron plug 40 disposed within the center of the digit "0" provides the preferred actuating means. However, in an alternative embodiment, a magnet is employed as plug 40 in order to increase the distance through which the magnetic switch 50 is actuated.

Figure 2:
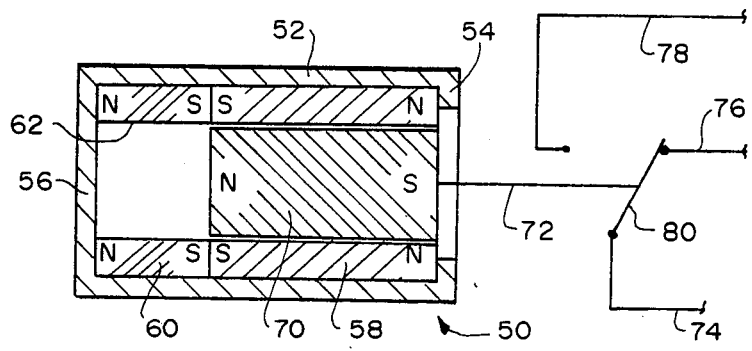
FIG. 2 is a schematic illustration of magnetic and electrical switching devices useful with the present invention, said devices,, illustrated in first positions in the absence of an actuator within actuating proximity.
Figure 3:
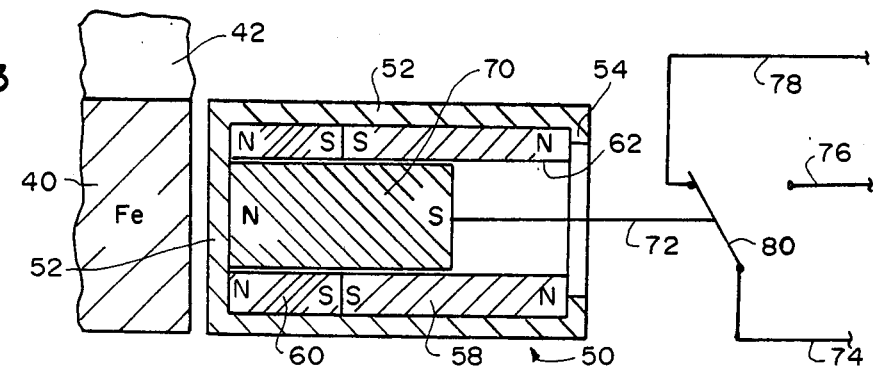
FIG. 3 is a schematic illustration of magnetic and electrical switching devices useful with the present invention, said devices illustrated in second positions in the presence of an actuator within actuating proximity.

An exemplary magnetic switch 50 and electrical switch 80 are schematically illustrated in FIGS. 2 and 3. The exemplary magnetic switch 50 comprises a housing having a cylindrical side 52 and end cap 56 of a non-magnetically attractive material, e.g., stainless steel. An annular magnet 60 is disposed within the cylindrical housing 52 near the end cap 56 to provide a biasing means. A second annular magnet 58 is disposed within the cylindrical housing 52 adjacent the biasing magnet 60. A tab or ring 54 maintains the magnets 60 and 58 in fixed positions. The primary or movable magnet 70 is preferably a cylindrical magnet designed to slidably fit within the central bore 62 through the annular magnets 60 and 58. The poles of the fixed magnets 60, 58 and the movable magnet 70 when arranged as illustrated in FIGS. 2 and 3 act to maintain the movable magnet 70 in the position illustrated in FIG. 2 in the absence of a magnetically attractive actuating means in proximity with the end cap 56. In the illustrative example of FIG. 2, the biasing magnet 60 repels and the center magnet 58 attracts the movable magnet 70 to the illustrated position.

FIG. 3 illustrates the same magnetic switch 50 wherein an actuating means 40 disposed in a non-magnetically attractive indicator 42 has been brought within actuating proximity of the end cap 56 causing the movable magnet 70 to be attracted toward the actuating means 40. Those skilled in the art will be aware that the force of attraction between the actuating means 40 and the movable magnet 70 must be sufficient to overcome the biasing force developed by the fixed magnets 60, 58 or other biasing means, e.g., a weak spring to normally maintain the movable magnet in the position illustrated in FIG. 2. Those skilled in the art will appreciate that the strength of the magnets 70, 60, 58, the size of the actuating means 40 and the necessary proximity for actuation are readily adjusted to produce the desired system.

Movement of the movable magnet 70 of the magnetic switch 50 causes movement of an electrical switch, e.g., single pole double throw switch (SPDT) 80. The movable magnet 70 is connected to the electrical switch as by a mechanical linkage 72. In the absence of an actuating means 40 within actuating proximity of the magnetic switch 50, the SPDT switch 80 completes a circuit from the lead 74 through the lead 76 as illustrated in FIG. 2. When an actuating means 40 has been brought within actuating proximity of the magnetic switch 50, the SPDT switch 80 completes a circuit from the lead 74 through the lead 78.

A monitoring system in accord with the present invention is useful for many applications, several of which are illustrated in FIG. 1. The actuation of the magnetic switch 50 by the actuating means 40 upon each revolution of the wheel 42 of the display meter 28 sends an electrical signal along the lead 78 to a relay 30. This signal conveniently is employed to actuate a conventional fluid sampling device 32 useful for producing a composite sample of the fluid passing through the conduit 20. Another use for this signal is to advance a digital, computer or other readout device 34 conveniently located at a central location distant from the flow meter. Still another use for this signal is to reset a timer of an alarm device 36. A conventional alarm includes a timer having a visual and/or audio alarm and typically a means to stop the fluid flow, e.g., a motor shut down switch 38 to stop the pump motor 22. The device 36 is typically programmed to activate the alarm signals upon expiration of a predetermined time interval sufficient to define one revolution of the actuator means 40 in the absence of a malfunction or abnormality. Accordingly, resetting of the timer of the alarm device 36 in response to the electrical signal in the lead 78 indicates continued satisfactory flow in the conduit 20 and operation of the meter 28.

The foregoing description of the invention has been directed in primary part to a particular preferred embodiment and method in accordance with the requirements of the patent statutes and for purposes of explanation and illustration. It will be apparent, however, to those skilled in the art that many modifications and changes in the specifically described apparatus and method may be made without departing from the scope and spirit of the invention. For example, Applicant has illustrated and described a device and method employing an iron plug as the actuating means. However, those skilled in the art will appreciate that any material which will attract the movable magnet of the magnetic switch with sufficient force to overcome the biasing force and to actuate the electrical switch may be used as the actuating means. Therefore, the invention is not restricted to the particular form of construction and method illustrated and described, but covers all modifications which may fall within the scope of the following claims.

It is Applicant's intention in the following claims to cover such modifications and variations as fall within the true spirit and scope of the invention.

What is claimed is:

1. An apparatus for monitoring the flow volume in a conduit, comprising:
    means for converting the flow of a fluid in said conduit to rotary motion;
    a rotatable, visual indicator comprised of a non-magnetically attractive material to which said rotary motion is imparted, said indicator including about the periphery thereof visually perceptible sequential values indicative of the rotary position of said indicator;
    a non-magnetized actuator comprised of a magneticallly attractive material, said actuator disposed about a small arc of said periphery of said indicator;
    a magnetic switch disposed near said indicator, said magnetic switch comprising a plurality of magnets disposed in a non-magnetically attractive housing and including a movable magnet, said switch magnetically biased to a first position by the magnetic interaction forces of said movable magnet with the other magnets in said plurality, said magnetic switch temporarily actuated from said first to a second position by the proximity of said non-magnetized actuator once during each revolution of said indicator when said forces are exceeded by the attractive force of said movable magnet for said actuator; and
    an electrical switch mechanically linked to said movable magnet for producing an output indicative of said flow, said electrical switch actuated by actuation of said magnetic switch.

2. The apparatus of claim 1 wherein said actuator is a ferrous material.

3. The apparatus of claim 2 wherein said actuator is an iron plug.

4. The apparatus of claim 1 wherein the areas of the proximate faces of said actuator and said magnetic switch are substantially equal, said proximate faces determined when said magnetic switch is temporarily in said second position.

5. The apparatus of claim 1 further comprising means for temporarily sampling the fluid flowing in said conduit, said sampling means actuated by said electrical switch.

6. The apparatus of claim 1 further comprising means for stopping the flow of fluid in said conduit in response to the failure of said electrical switch to be actuated after a predetermined interval.

7. An apparatus for remotely monitoring the continued rotation of a non-magnetically attractive, rotatable visual indicator, comprising:
    actuating means comprised of a magnetically attractive but non-magnetized material, said actuating means disposed about a small arc of the periphery of said indicator;
    magnetic switching means disposed near said indicator and actuated by the proximity of said non-magnetized actuating means, said magnetic switching means comprising a plurality of magnets disposed in a non-magnetically attractive housing and including a first movable magnet, said switching means biased to a first position by the magnetic interaction forces of said movable magnet with the other magnets in said plurality, said switching means temporarily actuated to a second position when said forces are exceeded by the attractive force of said movable magnet for said actuating means; and
    electrical switching means mechanically linked to said movable magnet for producing an output indicative of continued rotation of said indicator, said electrtical switching means actuated by actuation of said magnetic switching means.

8. The apparatus of claim 7 wherein said actuating means is a ferrous material.

9. The apparatus of claim 8 wherein said actuating means is an iron plug.

* * * * *